No. 789,452. Patented May 9, 1905.

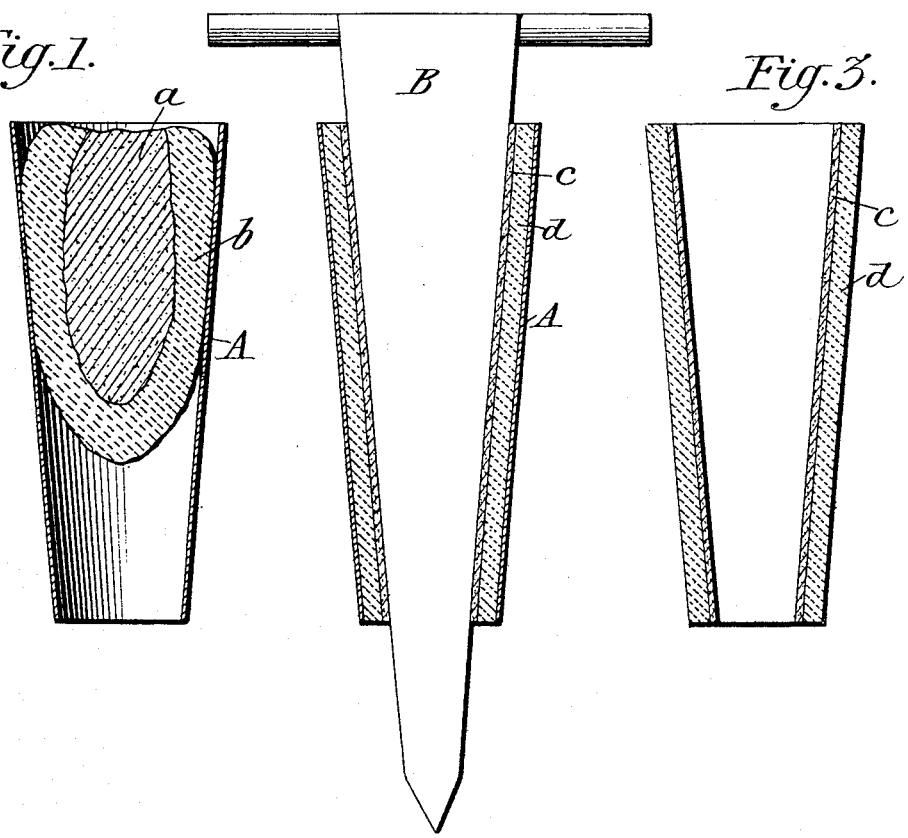

UNITED STATES PATENT OFFICE.

AUGUSTIN L. J. QUENEAU, OF SOUTH BETHLEHEM, PENNSYLVANIA, ASSIGNOR TO NEW JERSEY ZINC COMPANY, OF NEW YORK, N. Y., A CORPORATION OF NEW JERSEY.

METHOD OF MAKING COMPOSITE-WALL METALLURGICAL VESSELS.

SPECIFICATION forming part of Letters Patent No. 789,452, dated May 9, 1905.

Application filed August 22, 1904. Serial No. 221,693.

*To all whom it may concern:*

Be it known that I, AUGUSTIN L. J. QUENEAU, a citizen of the Republic of France, residing at South Bethlehem, county of Northampton, State of Pennsylvania, have invented certain new and useful Improvements in Methods of Making Composite-Wall Metallurgical Vessels; and I do hereby declare the following to be a full, clear, and exact description of the invention, such as will enable others skilled in the art to which it appertains to make and use the same.

My invention relates to the manufacture of composite crucibles, condensers for zinc-retorts, and like metallurgical vessels of the kind usually made in molds by the employment of shaping plungers or templets.

In the accompanying drawings I have illustrated the adaptation of my invention to the manufacture of a zinc-condenser.

Figure 1 represents in section a suitable zinc-condenser mold containing the composite ball from which the finished product is made. Fig. 2 represents a like view of the same with the plunger or mold-stamp in the lowered position completing the molding of the condenser. Fig. 3 represents a like view of the finished composite condenser.

The purpose of the invention is to make a metallurgical vessel of composite-wall structure, so that the interior and exterior layers may each be composed of a mixture appropriate to the particular conditions of use—as, for instance, in the case of a zinc-retort condenser, the outer wall or layer may consist of the usual fire-clay-and-sand mixture, while the inner wall or layer may consist of a mixture of fire-clay with a basic or inert material. I find that I can mold a vessel of this kind by a single stroke of the plunger or former by suitably preparing and arranging the materials in the mold.

In carrying out my invention I take a ball of the refractory material designed for the inner lining—as, for instance, a plastic mixture of fire-clay and chromite or fire-clay and carborundum—and slap and knead it to the required shape. This ball I then wrap with a sheet of the material designed for the outer surface—as, for instance, a plastic mixture of fire-clay and sand. The composite ball or batch thus constituted is then still further slapped and kneaded until all adhering or occluded air-bubbles are expelled, whereupon it is finally shaped into the semblance shown in Fig. 1, wherein $a$ indicates material intended for the inner lining, and $b$ indicates the material intended for the outer lining. This composite ball is then placed in the mold—for instance, the tapering sheet-iron mold A—and the plunger stamp or former B is inserted and pressed home, as indicated in Fig. 2. The result is the formation of a finished composite-wall vessel at a single operation of the plunger—as, for instance, the condenser shown in Fig. 3, having an inner wall $c$ of fire-clay and some basic or inert material and an outer wall of fire-clay and sand.

Having thus described my invention, what I claim is—

The method of making composite-wall metallurgical vessels, which consists in preparing a ball of sheet plastic mixture intended for the inner wall, wrapping said ball with a sheet of a wet plastic mixture intended for the outer wall, and bringing the said sheet into intimate contact with the outer surface of the said ball, introducing the composite ball into a mold, and forming the finished article by forcing a templet or former into the composite ball; substantially as described.

In testimony whereof I affix my signature in presence of two witnesses.

AUGUSTIN L. J. QUENEAU.

Witnesses:
G. A. BRANTIGAM,
H. W. BLUNT.